(12) United States Patent
Egan (10) Patent No.: US 7,360,518 B2
(45) Date of Patent: Apr. 22, 2008

(54) EXPANDABLE MANIFOLD (76) Inventor: Robert M. Egan, 2724 Williamstown Rd., Franklinville, NJ (US) 08080

( * ) Notice: Subject to any disclaimer, the term of this patent is extended or adjusted under 35 U.S.C. 154(b) by 0 days.

(21) Appl. No.: 11/194,813

(22) Filed: Aug. 1, 2005

(65) Prior Publication Data
US 2007/0022996 A1 Feb. 1, 2007

(51) Int. Cl.
F02M 35/10 (2006.01)
(52) U.S. Cl. ............. 123/184.21; 123/184.53; 181/240; 60/324
(58) Field of Classification Search ......... 123/184.21, 123/184.58, 184.53, 184.46, 184.56; 181/240; 60/324
See application file for complete search history.

(56) References Cited

U.S. PATENT DOCUMENTS

| 3,875,918 A | * | 4/1975 | Loynd .................. 123/184.56 |
| 4,013,049 A | | 3/1977 | Dilgard et al. |
| 4,848,281 A | * | 7/1989 | McCord ................ 123/184.58 |
| 5,205,244 A | | 4/1993 | Nakamura et al. |
| 5,662,077 A | | 9/1997 | Boswell |
| 5,740,779 A | | 4/1998 | Spencer-Smith |
| 5,850,813 A | | 12/1998 | Cooney et al. |
| 6,067,949 A | | 5/2000 | Hughes et al. |

* cited by examiner

Primary Examiner—Stephen K. Cronin
Assistant Examiner—Hyder Ali (57) ABSTRACT

An expandable manifold comprises an expansion chamber defined by a resilient surface. Intake is provided by a conduit extending into the chamber. As reverse impulses resulting from the closing of an intake valve enter the expansion chamber from the output end of the chamber, the volume of the chamber increases as the resilient surface expands. The reverse impulses propagate along the inner surface of the resilient surface toward a void defined by the outer surface of the conduct and the inner surface of the resilient surface. When the intake valve reopens, the reverse impulse flow is redirected and combined with intake flow from the source of fuel/air. The reverse impulses are redirected within and proximate the void. Energy associated with the reverse flow is redirected and combined with the forward flow to improve overall engine performance.

10 Claims, 6 Drawing Sheets

EXPANDABLE MANIFOLD

FIELD OF THE INVENTION

The present invention generally relates to manifolds, and more specifically to a manifold having an expandable portion for utilizing reverse or back pressure within the manifold to improve induction of a gas or fluid within the manifold.

BACKGROUND OF THE INVENTION

Intake systems including manifolds for connecting one or more carburetors to a multi-cylinder internal combustion engine are well known. Typically, an air-fuel mixture is provided to the cylinders via the intake manifold. A common goal of many intake systems is to get as much air-fuel mixture into the cylinders as possible.

In a typical intake system, when a cylinder intake valve is open, the air-fuel mixture is pushed by atmospheric pressure into the engine causing the mixture to be rapidly be pushed through the intake manifold toward the combustion chamber. When the intake valve suddenly closes, this forward flow slams to a stop, resulting in high-pressure reverse flow. This high back pressure or reverse flow/wave makes its way up the intake manifold away from the intake valve typically back toward the carburetor.

This back pressure, or reverse flow, is actually a series of reverse pulses or shock waves that enter the intake tract when the intake valve or other means controlling the flow of the intake charge into the combustion chamber closes. The reverse impulse flow causes some of the forward flow to be slowed stalled or even reversed. In some engines, such as motorcycle engines when the cleaner is removed for example, the reverse impulse flow travels back through the carburetor and sprays the fuel and air mixture on the rider's leg. During idle, this reverse impulse flow is typically not severe enough to significantly affect engine performance or cause fuel spray through the carburetor. However, as the carburetor throttle is more fully opened, the amount and intensity of the fuel mixture flow is increased, and the amount and intensity of the reverse impulse flow accordingly is increased.

Detrimental effects of the reverse impulse flow are usually more severe in high performance internal combustion engines (e.g., motorcycle engines). However, motors of all types, including those utilizing piston porting, conventional valves, reed valves, and also rotary valves used for controlling communication between the intake tract and combustion chamber have a reverse flow problem.

Thus, a system capable of reducing the detrimental effects of reverse impulse flow is desired.

SUMMARY OF THE INVENTION

An exemplary expandable manifold comprises an expansion chamber defined by a resilient surface such as a radiator hose or the like. As reverse impulse flow resulting from the closing of an intake valve enters the expansion chamber, the volume of the chamber increases as the resilient surface expands. The expansion chamber comprises an area (void) toward which the reverse impulse flow tends to propagate and accumulate as the chamber expands. This propagation and accumulation deters the reverse flow from traveling back into and past the carburetor, or source of fuel/air. When the intake valve reopens, the reverse impulse flow is momentarily stored and redirected and combined with intake flow from the source of fuel/air. Accordingly, overall air/fuel intake is increased. This is due, in part to the volume of the chamber decreasing as the resilient surface tends toward its original shape and to the increase in speed/flow of the fuel mixture. Thus, during an increase in pressure within the chamber, when the valve is closed, the reverse impulse flow is essentially prevented from traveling into the fuel/air source. Also, when the valve reopens, the energy associated with the reverse flow is redirected and combined with the forward flow to improve overall engine performance.

The expandable manifold dynamically adapts to the amount of intake flow and reverse impulse flow. For example, as the throttle of a carburetor is opened, the forward flow increases. When the intake valve closes, the reverse impulse flow correspondingly increases, and the pressure within the expansion chamber also correspondingly increases. As the pressure increases, the resilient surface expands to accommodate the increased pressure. The volume within the chamber also correspondingly increases, thus dynamically accommodating the increased reverse impulse flow. Further the tendency of the resilient surface to "snap back" to its original shape dynamically facilitates the recombination of the redirected reverse impulse flow and the intake flow.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

An expandable manifold is described herein with application to internal combustion engines. It is to be understood however, that application of the expandable manifold is not limited to internal combustion engines, but is also applicable to any pneumatically and/or hydraulically operated machine or device. Although described herein in the context of an intake manifold, also it is envisioned that the expandable manifold has application in the exhaust tract of an internal combustion engine or any pneumatically and/or hydraulically operated machine or device.

Figure 1:
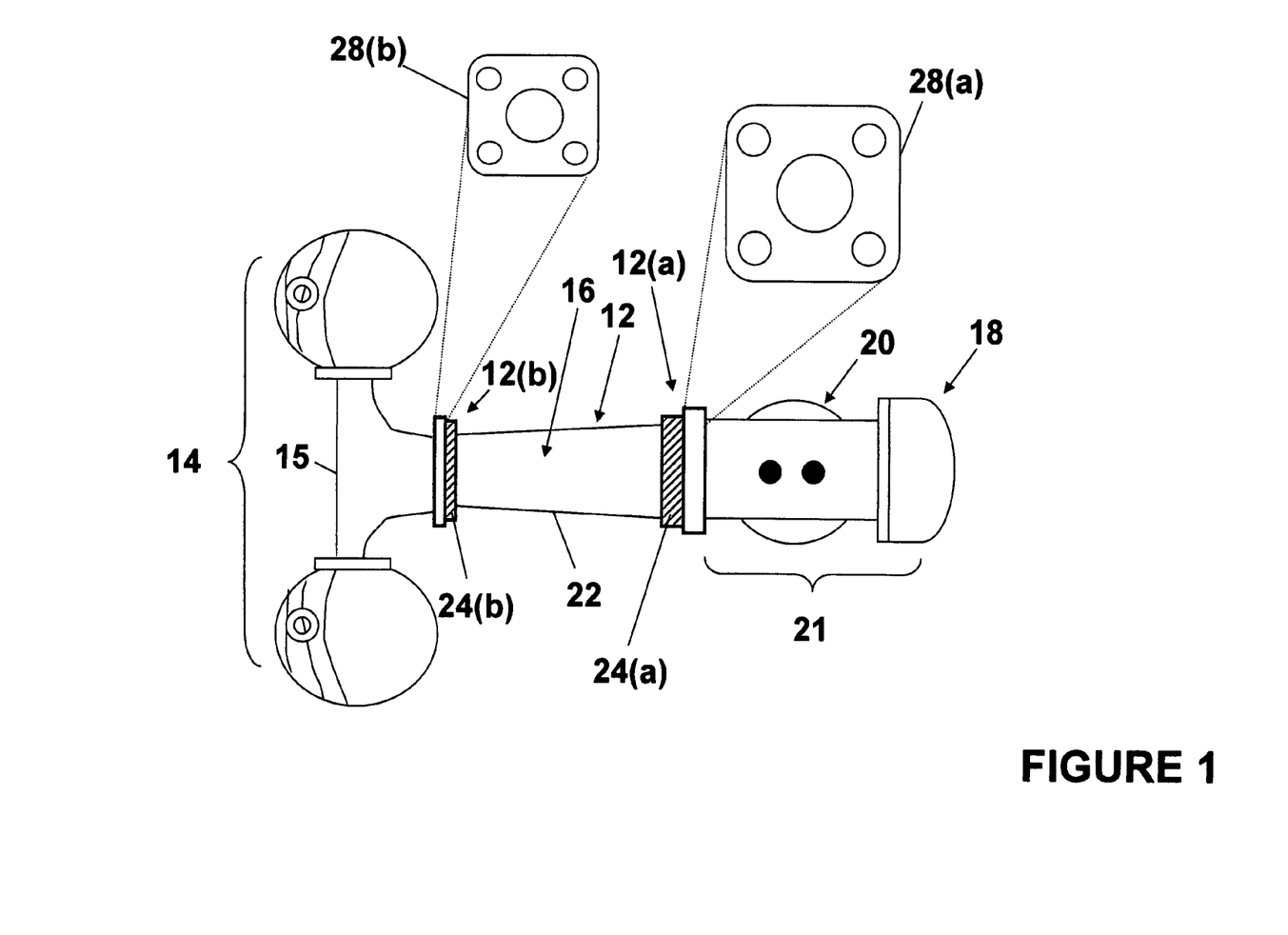
FIG. 1 is a top view of an expandable manifold, functioning as an intake manifold, coupled to an engine cylinder assembly and a carburetor assembly, in accordance with an exemplary embodiment of the present invention.

FIG. 1 is a top view of an expandable manifold 12, functioning as an intake manifold, coupled to cylinder assembly 14 including a manifold 15 and a carburetor assembly 21, in accordance with an exemplary embodiment of the present invention. The carburetor assembly 21 comprises a carburetor 20 and an air cleaner 18. The expandable manifold 12 comprises an intake end 12(a) and an output end 12(b). The intake end 12(a) is capable of receiving fluid or gas, such as an air-fuel mixture. The air-fuel mixture is provided to the cylinder assembly 14, via the output end 12(b) of the expandable manifold 12. The expandable manifold 12 comprises a resilient surface 22 that defines an expansion chamber 16 therein, through which the fuel mixture flows. The resilient surface 22 is coupled to a flange 28(a) of the carburetor assembly 21 by connector 24(a) and to a flange 28(b) of the cylinder assembly 14 via manifold 15 by a connector 24(b). Connectors 24(a) and 24(b) may comprise any appropriate connector such as a clamp (e.g., radiator hose clamp), an adhesive, or a combination thereof. The coupling of the resilient surface 22 to the flanges 28(a) and 28(b) is essentially gas tight. That is, no gas and/or fluid (e.g., fuel mixture) is intended to leak through the couplings. In an alternate embodiment, the expandable manifold 12 is integrally coupled to the cylinder assembly 14 and/or the carburetor assembly 21. As depicted in FIG. 1, the air-fuel mixture is provided via the carburetor assembly 21. The fuel (not shown in FIG. 1) is provided via the carburetor 20 and the air (not shown in FIG. 1) is provided via the air cleaner 18. The air and fuel are mixed within the carburetor assembly 21. The expandable manifold 12 as shown in FIG. 1, functions as an intake manifold, however it is not limited thereto. It is to be understood, that the expandable manifold 12 can also be implemented as an exhaust manifold.

Figure 2:
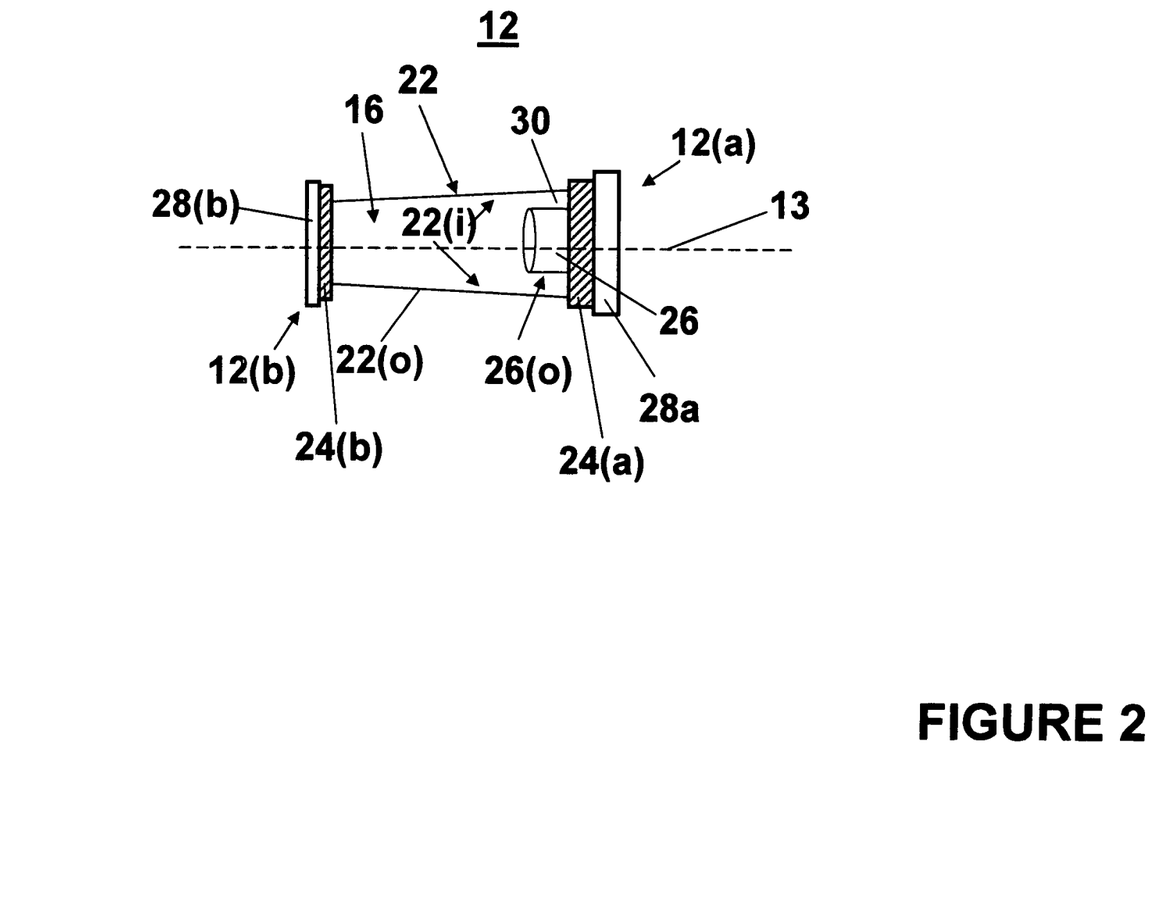
FIG. 2 is a see-through diagram of the expandable manifold showing a conduit and a void within the expansion chamber, in accordance with an exemplary embodiment of the present invention.

FIG. 2 is a see-through diagram of the expandable manifold 12 showing a conduit 26 and a void 30 within the expansion chamber 16, in accordance with an exemplary embodiment of the present invention. The conduit 26 extends into the expansion chamber 16 from the intake end 12(a). In an exemplary embodiment, the expansion chamber is generally cylindrical having a central longitudinal central axis 13. In an exemplary embodiment, the cross sectional area of the intake end 12(a) of the expansion chamber 16 is greater than the cross sectional area of the output end 12(b) of the expansion chamber. It is to be understood however, that this configuration is exemplary and other configurations are applicable. For example, the cross sectional area of the intake end 12(a) of the expansion chamber 16 can be approximately equal to the cross sectional area of the output end 12(b) of the expansion chamber. In anther exemplary embodiment, the cross sectional area of the intake end 12(a) of the expansion chamber 16 is less than the cross sectional area of the output end 12(b) of the expansion chamber. The void 30 is defined by the outer surface 26(o) of the conduit 26 and the inner surface 22(i) of the resilient surface 22. The resilient surface 22 may comprise any appropriate resilient material capable of expanding when pressure within the expansion chamber 16 of the expandable manifold 12 increases, and returning to its approximate shape/position when the increased pressure subsides. For example, the resilient surface 22 may comprise rubber, neoprene, a radiator hose or the like, or a combination thereof.

Figure 3A:
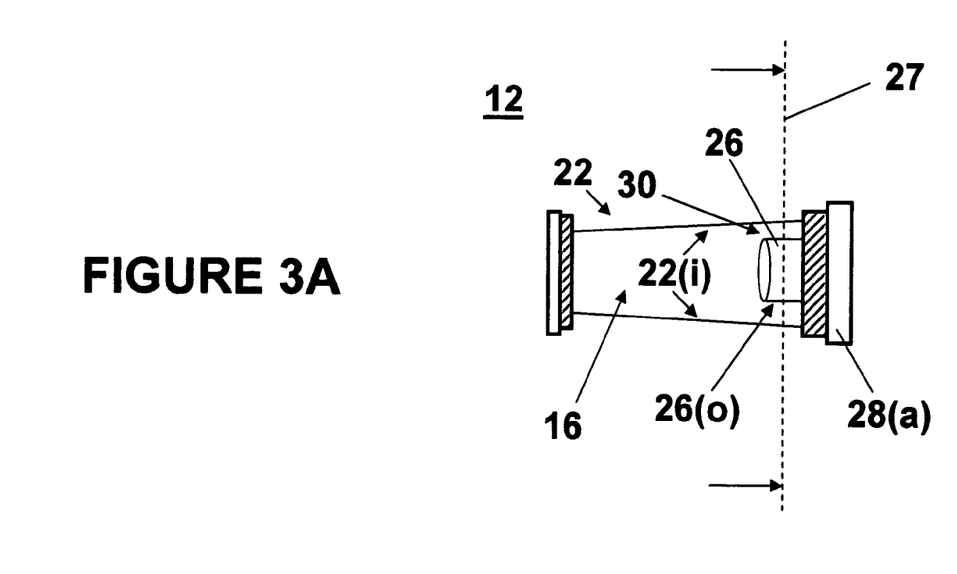
FIG. 3B is a cross sectional view of the expandable manifold from the viewpoint of looking into dashed line depicted in FIG. 3A, in accordance with an exemplary embodiment of the present invention.
Figure 3B:
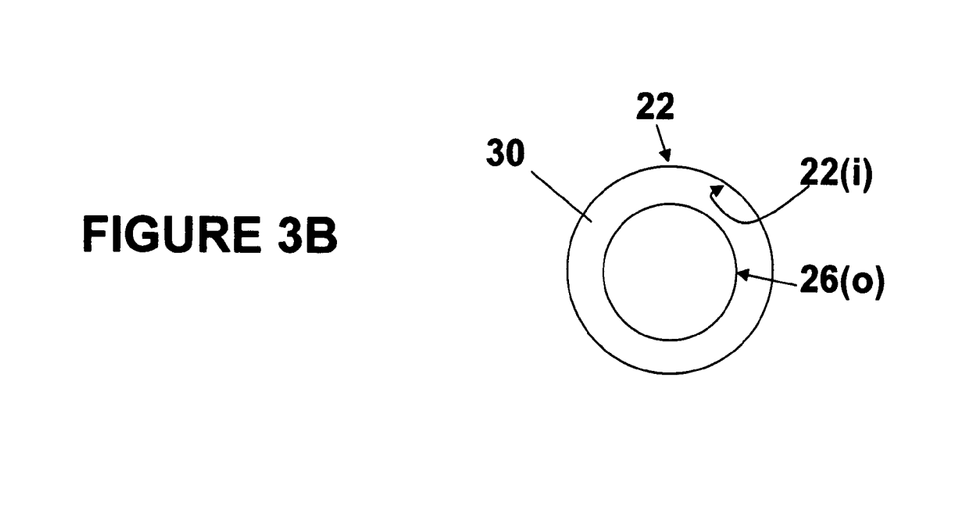

FIG. 3B is a cross sectional view of the expandable manifold 12 from the viewpoint of looking into dashed line 27 depicted in FIG. 3A, in accordance with an exemplary embodiment of the present invention. The void 30 comprises the region surrounding the outer surface 26(o) of the conduit 26 and bound by the inner surface 22(i) of the resilient surface 22. As described above, the coupling of the resilient surface 22 to the flange 28(a) is essentially gas/air/fluid tight. Thus, interaction of fluids occurring within the void 30 (described in more detail below) is not intended to cause a leak of fluid through the coupling. It is to be understood, that the boundaries of the void 30 are not precisely defined and are dynamic. As the resilient surface 22 moves, the volume of the void 30 varies.

Figure 4:
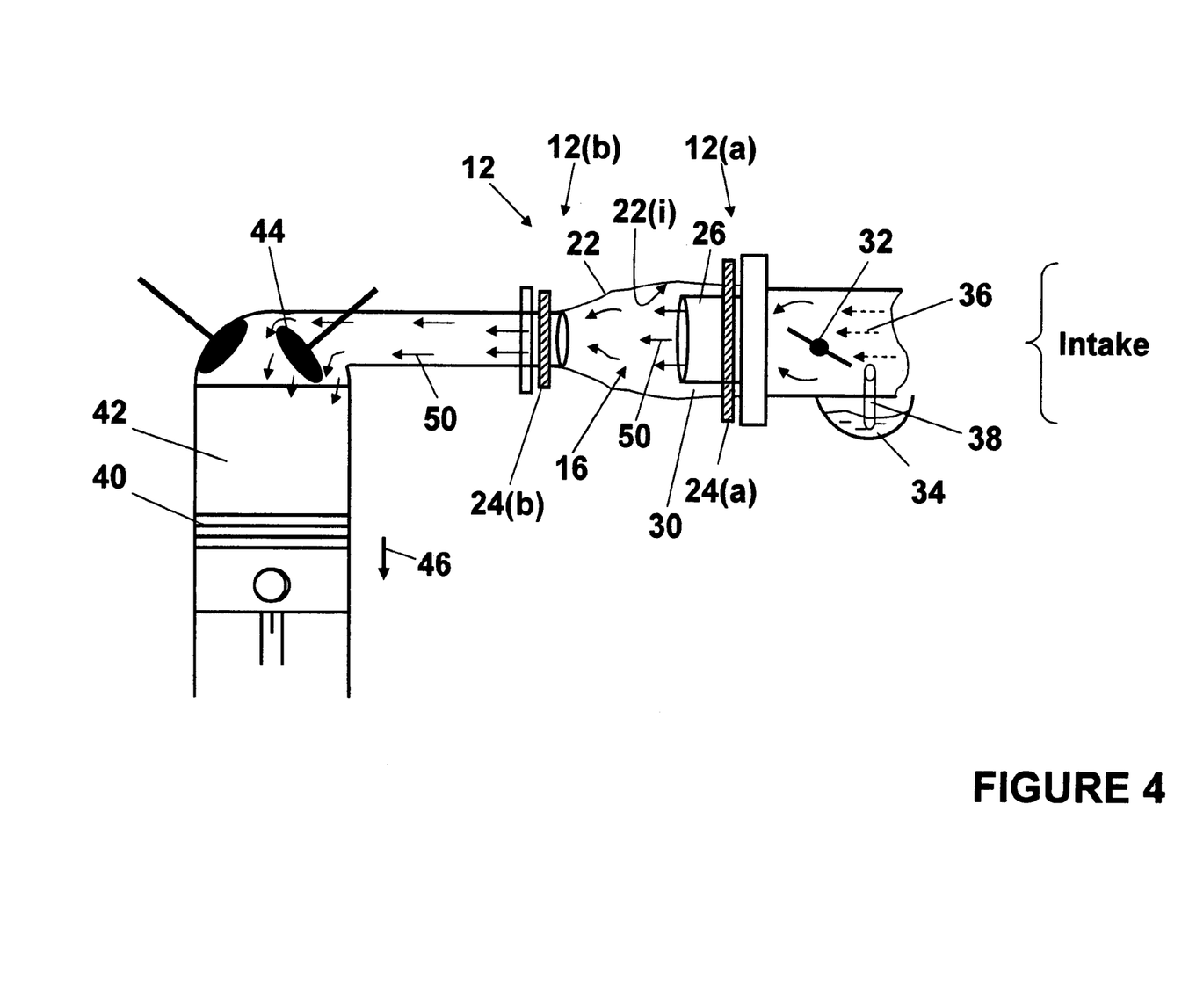
FIG. 4 is a diagram of the expandable manifold implemented as an intake manifold of an internal combustion engine, during an intake stroke without reverse impulse flow, in accordance with an exemplary embodiment of the present invention.

FIG. 4 is a diagram of the expandable manifold 12 implemented as an intake manifold of an internal combustion engine, during an intake stroke without reverse impulse flow, in accordance with an exemplary embodiment of the present invention. For purposes of describing FIG. 4, no reverse impulse flow has occurred yet. During the intake stroke, fuel 34 provided by fuel jet 38 is combined with air flow 36 by carburetor throttle 32, forming a fuel mixture. During the intake stroke, piston 40 moves downward, as indicated by arrow 46 and the fuel mixture flow 50 enters the expansion chamber 16 of the expandable manifold 12 via the conduit 26. The fuel mixture flow 50 enters a combustion chamber 42 though open valve 44. It is to be understood that the air fuel mixture referenced herein is exemplary and that other fuel mixtures are applicable.

Figure 5:
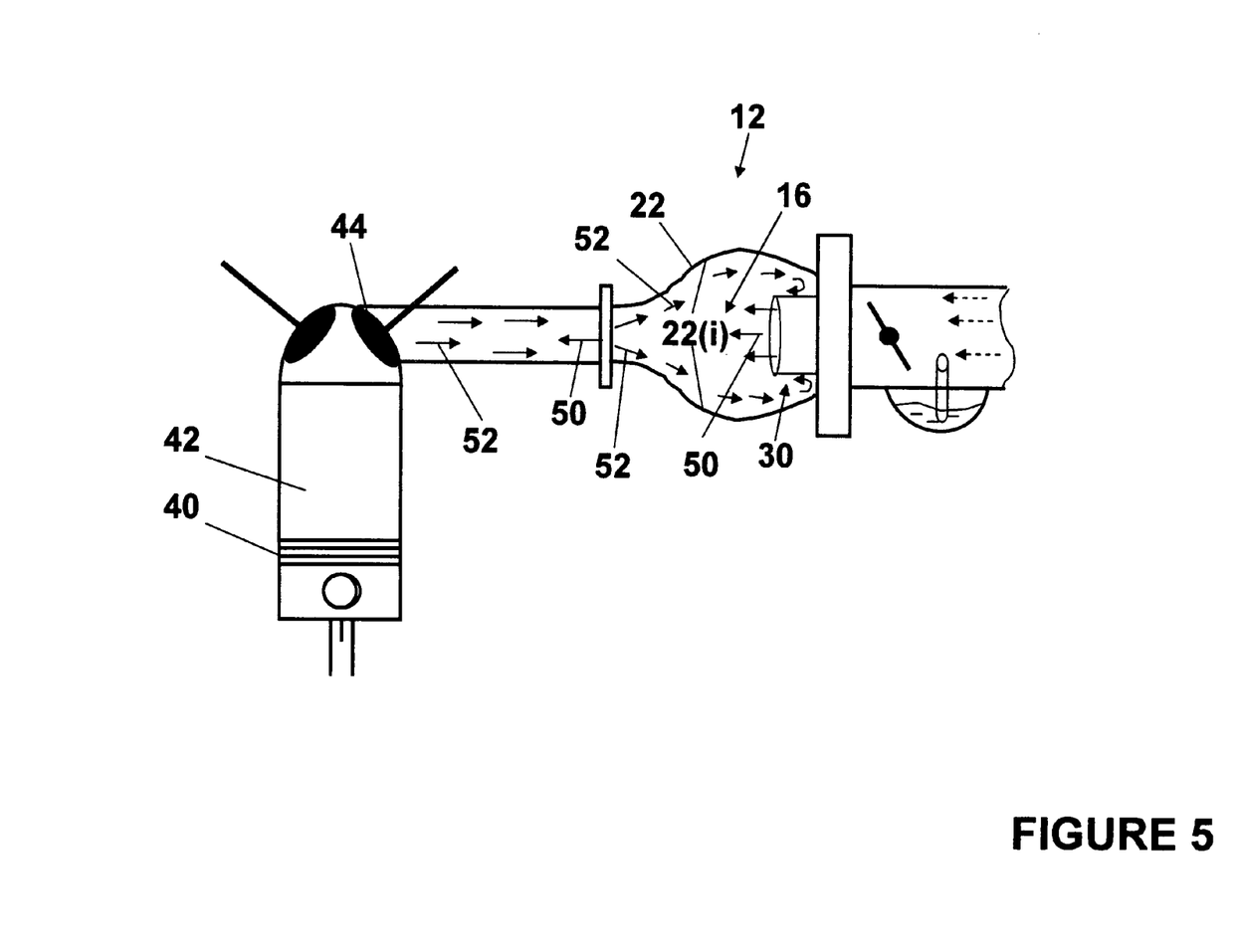
FIG. 5 is a diagram of the expandable manifold implemented as an intake manifold of an internal combustion engine, at the end of the combustion engine's intake stroke, in accordance with an exemplary embodiment of the invention.

FIG. 5 is a diagram of the expandable manifold 12 implemented as an intake manifold of an internal combustion engine, at the end of the combustion engine's intake stroke, in accordance with an exemplary embodiment of the invention. At the end of the intake stroke, the piston 40 is at the bottom of its travel, and the valve 44 is closed. The closing of the valve 44 causes reverse impulse flow as indicated by the arrows 52. The reverse impulse flow 52 tends to propagate toward the void 30, traveling along the inner surface 22(i) of the resilient surface 22 of the expandable manifold 12. The forward flow 50 tends to concentrate along the center of the expansion chamber 16. That is, the forward flow 50 tends to propagate along a longitudinal axis of said expansion chamber 16. The reverse impulse flow 52 causes pressure within the expansion chamber 16 to increase. This increase in pressure causes the resilient surface 22 to be pushed outward (expand), thus causing the volume of the expansion chamber 16 to increase. This correspondingly causes the volume of the void 30 to increase. As described below, when the valve 44 opens during a subsequent intake stroke, the pressure in the expansion chamber 16 begins to subside, and the resilient surface 22 tends to move inward to return to its original position.

Figure 6:
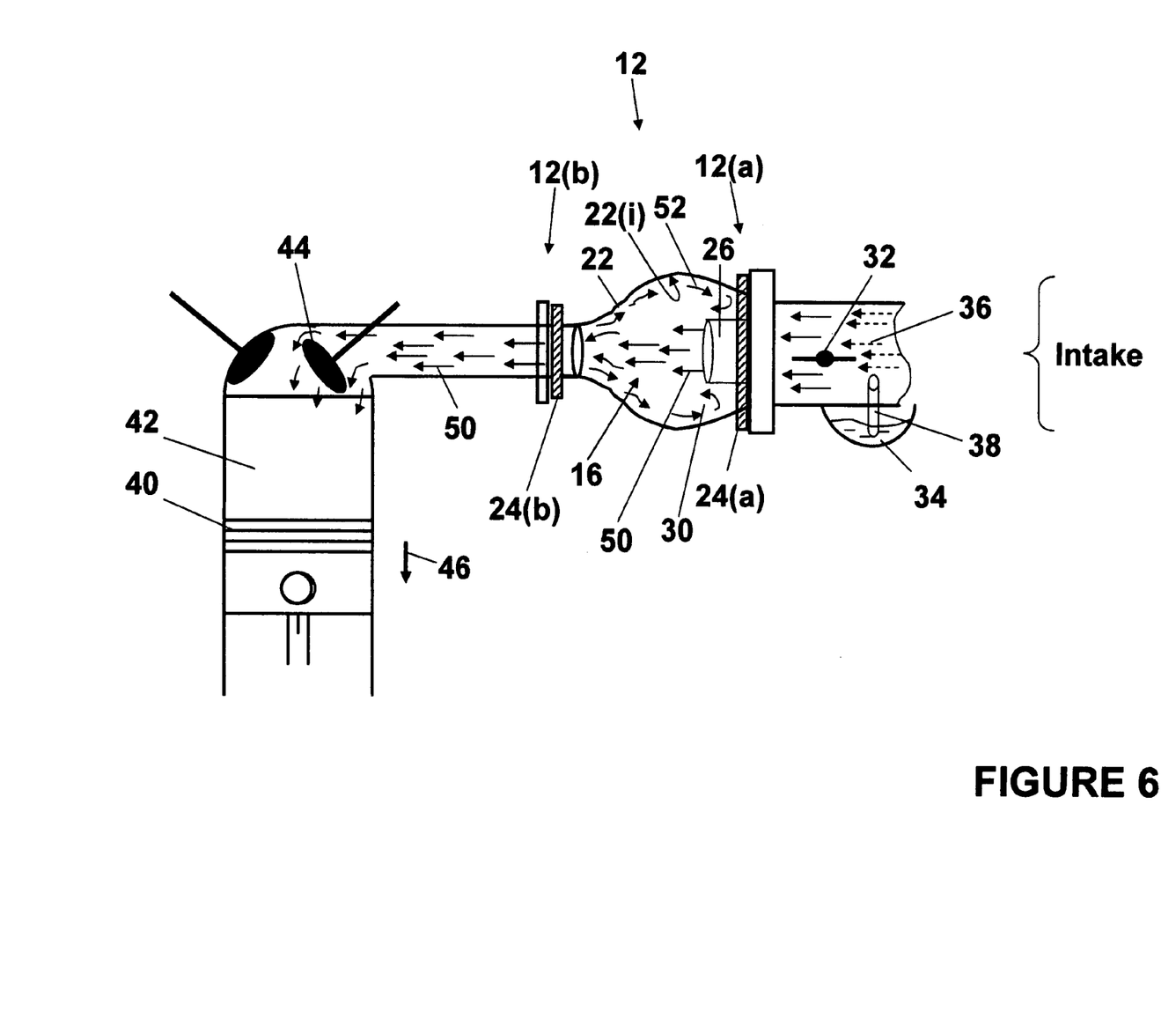
FIG. 6 is a diagram of the expandable manifold 12 implemented as an intake manifold of an internal combustion engine, during a subsequent intake stroke, in accordance with an exemplary embodiment of the invention.

FIG. 6 is a diagram of the expandable manifold 12 implemented as an intake manifold of an internal combustion engine, during a subsequent intake stroke, in accordance with an exemplary embodiment of the invention. Note that the carburetor throttle 32 in FIG. 6 is fully open. It is envisioned that the improved performance and efficiency of the internal combustible engine will be most noticeable and prominent during full throttle. During a subsequent intake stroke, the intake valve 44 is opened and fuel mixture flow 50 is pushed by atmospheric pressure through the expansion chamber 16 via the conduit 26 into the combustion chamber 42. This fuel mixture flow 50 tends to concentrate in the center of the expansion chamber 16. The reverse impulse flow 52, created by the previous closing of the valve 44, changes direction within the void 30 and is combined with the forward flow 50. The redirection of the reverse impulse flow 52 is a result, in part, of the resilient surface 22 trying to return to its approximate shape/position. Thus, during each subsequent intake stroke, the reverse impulse flow 52 that was previously created by the closing of the valve 44, is redirected within and proximate the void 30 and combined with the forward flow 50. During each subsequent closing of valve 44, reverse impulse flow is created and travels toward void 30 along the inner surface 22(*i*) of the resilient surface 22, the pressure within the expansion chamber 16 increases, and the volume of the expansion chamber 16 increases.

If the surface of the manifold were not expandable (rigid), the volume within the chamber of the manifold would not be able to increase. The reverse impulse flow resulting from the closing of the valve (such as valve 44), having no place else to go, would only partially be contained and would flow into the conduit (such as conduit 26) and into the carburetor assembly. This can result in fuel mixture being sprayed out of the carburetor. This can also result in decreased performance of the combustion engine, because the next intake stroke would have to overcome the reverse flow previously created.

As illustrated in FIG. 6, the efficiency of the internal combustion engine is improved because the energy associated with the reverse flow 52 is combined with the energy associated with the forward flow 50. Thus, the energy associated with the reverse impulse flow 52 is redirected within and proximate the void 30 and added to the energy associated with the forward flow 50, thereby increasing engine efficiency. The void 30 provides an area for the reverse impulse flow 52 to be redirected toward the cylinder assembly (forward flow direction). The reverse impulse flow causes some turbulence. Thus, the void 30 provides and area for the turbulence to occur while minimizing the detrimental effects on the forward flow. In essence, the reverse impulse flow is out of the way of the forward flow. The increase in performance gets more air fuel mixture to the cylinders than would be possible if the manifold were not expandable.

The expandable manifold 12 dynamically adapts to combine the energies of the reverse impulse flow and the forward flow as the forward flow 50 increase, and the corresponding reverse impulse flow 52 increases. For example, as the throttle of a carburetor is opened, the forward flow increases. As the pressure increases within the expansion chamber 16, the volume within the expansion chamber increases to accommodate the increased pressure. The volume of the void 30 thereby also increases, providing a larger area to accommodate the redirection of the reverse impulse flow. Further the tendency of the resilient surface to "snap back" to its original shape dynamically facilitates the recombination of the redirected reverse impulse flow and the intake flow.

While embodiments of the expandable manifold have been described in connection with the illustrative embodiments of the various figures, it is to be understood that other similar embodiments may be used or modifications and additions may be made to the described embodiment for performing the same function of the present invention without deviating therefrom. Furthermore, it should be emphasized that the expandable manifold can operate as an intake manifold and/or an exhaust manifold. The expandable can be used with internal combustion engines and/or pneumatic systems. Therefore, the present invention should not be limited to any single embodiment, but rather should be construed in breadth and scope in accordance with the appended claims.

What is claimed is:

1. An expandable manifold comprising:
   an intake end;
   an output end opposite said intake end;
   a flexible expansion chamber defined by a resilient surface, said expansion chamber positioned between said intake end and said output end, wherein:
      said resilient surface is expandable responsive to an increase in pressure within said chamber and contractible responsive to a decrease in pressure within said chamber;
      a pressure within said chamber tends to increase as a first fluid flows into said chamber from said output end;
      said resilient surface tends to expand responsive to said increased pressure;
      a volume of said chamber tends to increase responsive to said increased pressure;
      said increased pressure within said chamber tends to be reduced as a second fluid flows into said chamber via said conduit;
      said resilient surface tends to contract responsive said reduced pressure; and
      said increased volume tends to decrease responsive to said reduced pressure;
   a conduit extending within said expansion chamber from said intake end, said conduit being coupled to said expansion chamber in a fluid tight relationship; and
   a void within said expansion chamber, said void defined by an outer surface of said conduit and an inner surface of said resilient surface of said expansion chamber, wherein:
      a volume of said void is increasable responsive to an increase in internal pressure of said chamber; and
      said volume of said void is decreasable responsive to a decrease in internal pressure of said chamber.

2. A manifold in accordance with claim 1, wherein:
   an internal volume of said expansion chamber is increasable responsive to an increase in internal pressure of said chamber; and
   said internal volume of said expansion chamber is decreasable responsive to a decrease in internal pressure of said chamber.

3. A manifold in accordance with claim 1, wherein:
   a first fluid flowing into said chamber from said output end tends to propagate along an inner surface of said resilient surface; and
   a second fluid flowing into said chamber via said conduit tends to propagate along a central longitudinal axis of said expansion chamber.

4. A manifold in accordance with claim 3, wherein:
   a direction of flow of said first fluid is redirected within and proximate said void; and
   said redirected first fluid is combined with said second fluid along and proximate said central longitudinal axis.

5. A manifold in accordance with claim 4, wherein a direction of flow of said combined fluids is toward said output end.

6. A manifold in accordance with claim 1, wherein:
   a cross sectional area of said intake end of said expansion chamber is greater than a cross sectional area of said output end of said expansion chamber.

7. A method for combining fluid flows, said method comprising:
   in an expandable chamber defined by a resilient surface, said expandable chamber comprising a first end and a second end opposite said first end, propagating a first fluid toward said first end along said inner surface of said resilient surface of said chamber, wherein:

said resilient surface is expandable responsive to an increase in pressure within said chamber and contractible responsive to a decrease in pressure within said chamber;

a pressure within said chamber tends to increase as a first fluid flows into said chamber from said output end;

said resilient surface tends to expand responsive to said increased pressure;

a volume of said chamber tends to increase responsive to said increased pressure;

said increased pressure within said chamber tends to be reduced as a second fluid flows into said chamber via said conduit;

said resilient surface tends to contract responsive said reduced pressure; and said increased volume tends to decrease responsive to said reduced pressure;

propagating a second fluid toward said second end along a central longitudinal axis of said chamber, wherein said second fluid is propagated via a conduit extending within said expansion chamber from said first end, said conduit being coupled to said expansion chamber in a fluid tight relationship;

redirecting a direction of propagation of said first fluid within and proximate a void, said void being defined by an outer surface of said conduit and an inner surface of said resilient surface of said expansion chamber; and combining said redirected first fluid with said second fluid along and proximate said central longitudinal axis.

8. A method in accordance with claim 7, wherein a direction of flow of said combined fluids is toward said second end.

9. A method in accordance with claim 7, further comprising:

increasing a volume of said chamber responsive to said first fluid flow into said chamber.

10. A method in accordance claim 7, wherein said volume of said chamber is increased responsive to receipt of said first fluid flow.

* * * * *